C. A. ERICKSON.
UNIT POWER PLANT.
APPLICATION FILED NOV. 25, 1913.

1,178,578.

Patented Apr. 11, 1916.
2 SHEETS—SHEET 1.

Witnesses:
M. J. Cooper
S. A. Thornton

Inventor
Charles A. Erickson
By his Attorneys

C. A. ERICKSON.
UNIT POWER PLANT.
APPLICATION FILED NOV. 25, 1913.
1,178,578.
Patented Apr. 11, 1916.
2 SHEETS—SHEET 2.
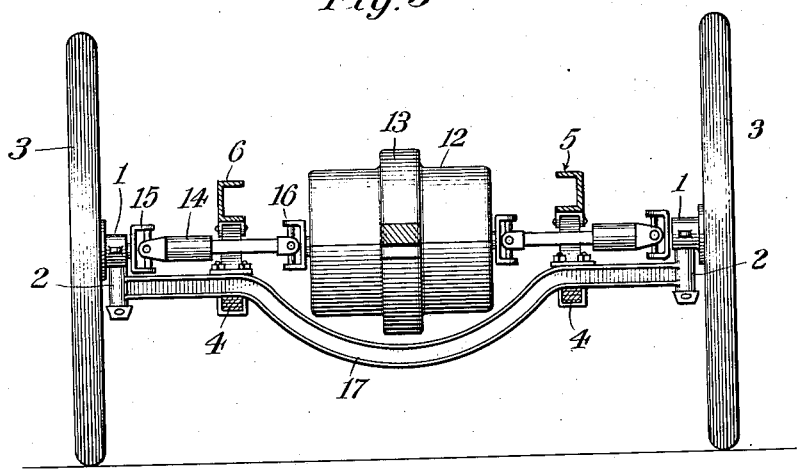
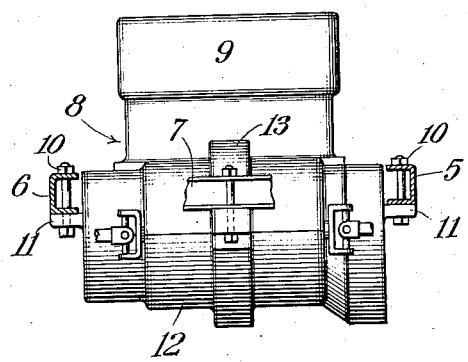

UNITED STATES PATENT OFFICE.

CHARLES A. ERICKSON, OF DETROIT, MICHIGAN.

UNIT POWER PLANT.

1,178,578.     Specification of Letters Patent.     Patented Apr. 11, 1916.

Application filed November 25, 1913. Serial No. 802,887.

*To all whom it may concern:*

Be it known that I, CHARLES A. ERICKSON, a citizen of the United States, residing in Detroit, in the county of Wayne and State of Michigan, have invented certain new and useful Improvements in Unit Power Plants, of which the following is a specification.

My invention relates to a unit power plant for motor vehicles and an object of my invention is to provide a power plant which can be readily dismounted from the vehicle and which is resiliently mounted relative to the running gear and has a direct driving connection with the traction wheels.

Various other objects and advantages will be in part obvious and in part more fully set forth in the following description of one physical embodiment of my invention, which broadly comprises a motor casing mounted between the side bars of the chassis and a gear casing attached to the motor casing and supported by a transverse element of the chassis to form a three point suspension, the actuating mechanism in which gear case is operatively connected to the traction wheel without the use of intermediate gearing.

The invention further consists in certain details of construction and arrangement of parts hereinafter set forth and claimed.

Figure 1:
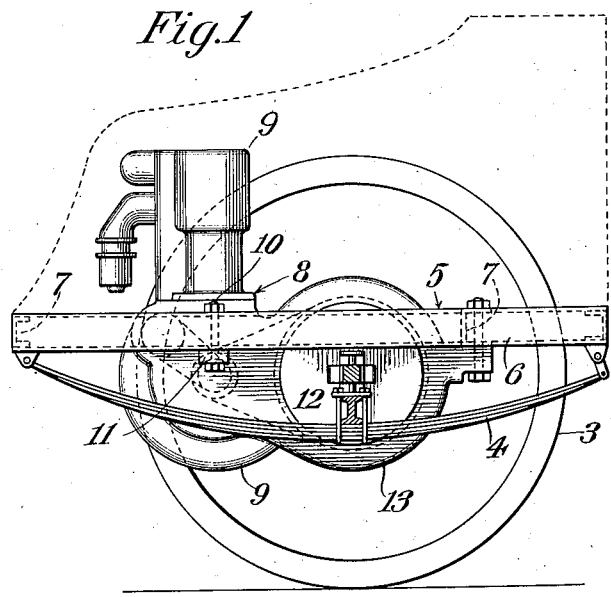
Figure 2:
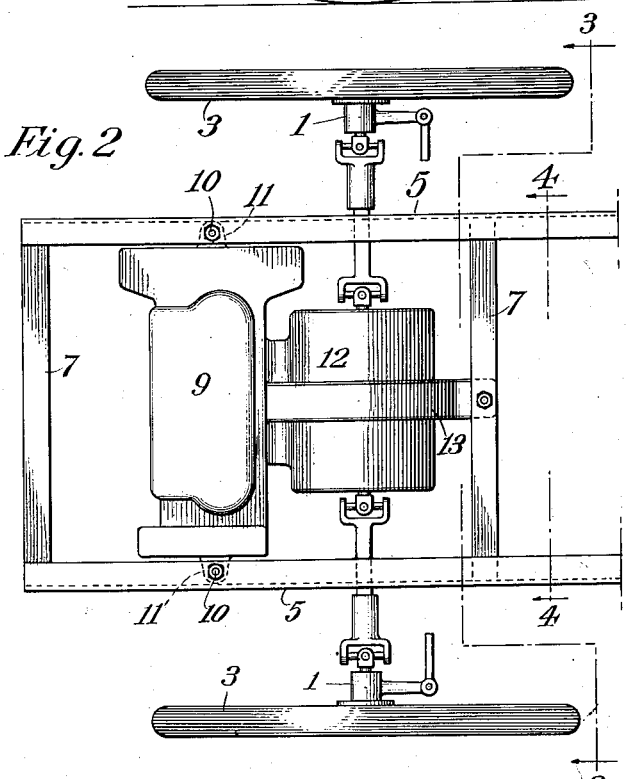

In the accompanying drawings: Figure 1 is a side elevation of a fore carriage unit disclosing one form of my invention; Fig. 2 is a plan view looking down upon the device shown in Fig. 1; Fig. 3 is a transverse sectional view taken on the line 3—3 of Fig. 2 looking in the direction of the arrows; and Fig. 4 is a view taken on the line 4—4 of Fig. 2 showing a rear elevation of the power unit.

In the several figures is a running gear including an axle 1 which may be either the rear or the front axle of a motor vehicle. Each end of the axle terminates in an upstanding post 2 which may be a steering knuckle and which provides a journal for the wheel spindle carrying the traction wheels 3. Resiliently mounted upon the running gear by suitable means, such as, the semi-elliptical springs 4 is an open frame 5 forming part of the chassis of the vehicle and preferably formed of longitudinally extending side channel bars 6 and similarly connecting transverse bars 7. Positioned within the bars forming the open frame is a unit power plant 8, which includes the motor casing 9 extending transversely of and having opposite ends suitably supported from the side bars 6 as by means of bolts 10 passing through the flanges of the bars and through lugs 11 projecting from the motor casing 5. The power plant also includes a gear casing 12 one side of which is supported by and preferably formed integral with the motor casing 9 and the opposite side of which is supported from one of the transverse bars 7 preferably by bolting a strap 13 extending therefrom to the underside of the member 7.

The gear casing 12 is adapted to contain the transmission, differential and brake mechanism usual with devices of this character and is operatively connected to drive the traction wheel by means of driving shafts 14 connected by means of universal joints 15 with the driving spindle of the traction wheel and by means of universal joints 16 with the gearing within the casing 12. The shafts 14 are maintained substantially in the axis of rotation of the wheels 3 and to provide room for the bulk of the gear casing the axle 1 is offset as shown at 17, but this offsetting is in a vertical plane which contains the wheel spindle and the driving shafts.

By means of a structure of this character there is provided a direct driving of the traction wheels with the least amount of connecting shafts and without any exposed gearing outside of the casing. The universal joints permit the relative movement between the running gear and the resiliently mounted power unit without materially affecting the direct driving connection between the plant and the traction wheels. The power plant can be readily dismounted or installed in the open frame, by merely loosening the holding bolts and possesses all of the advantages of a three point suspension and permits straining twists on the frame without offsetting the driving mechanisms carried by the casings 9 and 12.

Offsetting the portions of the axle vertically maintains the metal in the most advantageous position to resist the normal strains upon this member which are usually vertical, and at the same time there is provided an arrangement of parts permitting a direct line drive substantially along the axis of rotation of the traction wheels while permitting some vertical play to the running gear while the plant is carried along on a cushioned support. By mounting the relatively heavy motor casing 9 between the side channel bars 6 the heavy weight of this part may be distributed about the transverse line connecting the side supports and the relatively light gear casing 12 may be balanced about a longitudinal line passing through the third point of suspension thus placing substantially the same weight on the three points of suspension.

Although I have shown only one form of mechanism embodying my invention, it is obvious that various changes within the skill of the mechanic may be made therein without departing from the spirit of the invention, provided the means set forth in the following claims are employed.

Having thus described my invention, I claim:—

1. In a motor propelled vehicle, the combination with a running gear and an open frame mounted thereon, said frame having a transverse and a pair of longitudinal members, a driving unit having a three point suspension, said points forming the apexes of a substantially equilateral triangle and fastened to said transverse and to each of said longitudinal members, said unit comprising a motor casing substantially balanced on a transverse line connecting the points of suspension on the longitudinal members and a gear casing substantially balanced on a line bisecting said transverse line and passing through the point of suspension on the transverse member and a transverse driving member directly connecting said running gear with said gear casing.

2. In a motor propelled vehicle, the combination with an axle having steering knuckles at opposite ends thereof and a frame supported therefrom, traction wheels on said knuckles, of driving shafts disposed substantially in the axis of rotation of said wheels when in normal position and connected directly therewith, a self contained power unit demountably fixed to said frame and including a gear casing directly connected to said shafts and an internal combustion engine fixed to said casing for driving said driving shafts.

3. In a motor propelled vehicle, the combination with a running gear including a steering wheel and a flat open frame carried thereby, said frame including transverse and a pair of longitudinal elements, a self contained motor casing disposed within and having opposite ends supported from said frame, an internal combustion engine supported from said motor casing, a gear casing having one side supported from said motor casing and the other side supported from said transverse element, said gear and motor casings constituting a removable unit having a three point suspension on said frame and rigidly connected thereto, a driving connection having one end pivotally connected to said driving shaft and the other end pivotally connected to said steering wheel.

4. In a motor propelled vehicle, the combination with a running gear and a frame supported thereby, said frame including a transverse and a pair of longitudinal members, of a removable unit power plant adapted to be disposed within said frame and having three extensions therefrom adapted to be disposed beneath respectively the transverse and each longitudinal member and bolts depending from the members and adapted to engage said extensions to support the plant from the frame, said plant adapted to be lowered directly from the frame when the bolts are loosened.

5. In a motor propelled vehicle, the combination with a pair of traction wheels each having a driving spindle, an axle supported thereby, a chassis supported from said axle, of a self contained power unit supported directly from said chassis and comprising an internal combustion engine paralleling said axle and having opposite ends supported from the chassis and having a gear casing projecting from said engine and extending over said axle, means for supporting said gear casing centrally thereof and direct driving connections between the gear casing and the driving spindles of the traction wheels.

This specification signed and witnessed this 22 day of November, A. D. 1913.

CHAS. A. ERICKSON.

Signed in the presence of—
ALBERT A. HOFMANN,
H. J. HOWLAND.